(12) United States Patent
Kamakoti et al.

(10) Patent No.: US 11,542,446 B2
(45) Date of Patent: Jan. 3, 2023

(54) DEWAXING USING A MOLECULAR SIEVE CATALYST

(71) Applicant: ExxonMobil Technology and Engineering Company, Annandale, NJ (US)

(72) Inventors: Preeti Kamakoti, Berkeley Heights, NJ (US); Scott J. Weigel, Allentown, PA (US); Stephen J. McCarthy, Center Valley, PA (US); Shifang L. Luo, Annandale, NJ (US); Sina Sartipi, Brussels (BE); Martine Dictus, Willebroek (BE); Marc H. Anthonis, Hofstade (BE); Helge Jaensch, Grimbergen (BE)

(73) Assignee: Exxon Mobil Technology and Engineering Company, Annandale, NJ (US)

( * ) Notice: Subject to any disclaimer, the term of this patent is extended or adjusted under 35 U.S.C. 154(b) by 175 days.

(21) Appl. No.: 16/540,107

(22) Filed: Aug. 14, 2019

(65) Prior Publication Data

US 2020/0063042 A1    Feb. 27, 2020

Related U.S. Application Data

(60) Provisional application No. 62/723,125, filed on Aug. 27, 2018.

(51) Int. Cl.
*C10G 65/00* (2006.01)
*C10G 65/04* (2006.01)
(Continued)

(52) U.S. Cl.
CPC .............. *C10G 65/04* (2013.01); *B01J 29/85* (2013.01); *C10G 47/18* (2013.01);
(Continued)

(58) Field of Classification Search
CPC ........ C10G 45/02; C10G 45/62; C10G 45/64; C10G 65/04; C10G 65/12; C10G 47/00;
(Continued)

(56) References Cited

U.S. PATENT DOCUMENTS

| 4,205,053 A | 5/1980 | Rollmann et al. |
| 4,397,827 A | 8/1983 | Chu |

(Continued)

FOREIGN PATENT DOCUMENTS

| CN | 103301877 A | 9/2013 |
| CN | 103232044 B | 4/2015 |

(Continued)

OTHER PUBLICATIONS

The International Search Report and Written Opinion of PCT/US2019/046436 dated Oct. 15, 2019.

(Continued)

*Primary Examiner* — Prem C Singh
*Assistant Examiner* — Brandi M Doyle
(74) *Attorney, Agent, or Firm* — C. Tumey Law Group PLLC

(57) ABSTRACT

Methods are provided for using a molecular sieve catalyst for dewaxing formed using a synthesis mixture comprising a morphology modifier. The catalyst may be used, for example, for production of a lubricant base stock. For example, ZSM-48 crystals formed using the morphology modifier (and/or formulated catalysts made using such crystals) can have an increased activity and/or can provide an improved yield during catalytic dewaxing of lubricant base stocks.

26 Claims, 1 Drawing Sheet

(51) Int. Cl.
*B01J 29/85* (2006.01)
*C10G 47/18* (2006.01)

(52) U.S. Cl.
CPC ............... *B01J 2229/62* (2013.01); *C10G 2300/1085* (2013.01); *C10G 2400/10* (2013.01)

(58) Field of Classification Search
CPC ............ C10G 47/18; C10G 2300/1085; C10G 2400/04; C10G 2400/06; C10G 2400/10; B01J 29/85; B01J 29/7461; B01J 29/7469; B01J 29/7492; B01J 29/708; B01J 29/7661; B01J 2229/62; C01B 39/54; C01B 39/42; C01B 39/48

See application file for complete search history.

(56) References Cited

U.S. PATENT DOCUMENTS

| | | | |
|---|---|---|---|
| 5,063,038 A | 11/1991 | Kirker et al. | |
| 5,182,090 A | 1/1993 | Dwyer et al. | |
| 5,232,579 A | 8/1993 | Absil et al. | |
| 5,785,947 A | 7/1998 | Zones et al. | |
| 5,849,258 A * | 12/1998 | Lujano | B01J 20/18 |
| | | | 423/700 |
| 5,961,951 A | 10/1999 | Kennedy et al. | |
| 6,540,970 B1 | 4/2003 | Strohmaier et al. | |
| 10,016,747 B2 | 7/2018 | Zhang et al. | |
| 2002/0090337 A1 | 7/2002 | Corma Canos et al. | |
| 2007/0191658 A1 | 8/2007 | Lai et al. | |
| 2012/0202006 A1 | 8/2012 | Rimer | |
| 2016/0121315 A1 * | 5/2016 | Zhang | B01J 29/703 |
| | | | 208/57 |
| 2016/0122193 A1 | 5/2016 | Lai et al. | |
| 2017/0175011 A1 | 6/2017 | McCarthy et al. | |

FOREIGN PATENT DOCUMENTS

| | | | | |
|---|---|---|---|---|
| CN | 105016354 A | | 11/2015 | |
| CN | 108069436 | * | 5/2018 | |
| EP | 0026962 A1 | | 4/1981 | |
| EP | 0197775 A2 | | 10/1986 | |
| WO | 9222498 A1 | | 12/1992 | |
| WO | 9629284 A1 | | 9/1996 | |
| WO | WO 2008097481 | * | 8/2008 | ............ C01B 37/00 |
| WO | 2010/077352 A1 | | 7/2010 | |

OTHER PUBLICATIONS

The Partial International Search Report of PCT/US2019/047136 dated Dec. 11, 2019.
The Partial International Search Report of PCT/US2019/047185 dated Nov. 7, 2019.
The Partial International Search Report of PCT/US2019/047230 dated Nov. 14, 2019.
Gao, et al. "Development of hierarchical MCM-40 zeolite with intracrystalline mesopores and improved catlaytic performance in liquid alkylation of benzene with ethylene", Microporous and Mesoporous Materials, vol. 212, Mar. 18, 2015, pp. 1-7.
Lupulescu et al., "A facile strategy to design zeolite L crystals with tunable morphology and surface architecture", J. Am. Chem. Soc. 2013, 135, 6608-6617.
Kumar et al., "SSZ-13 crystallization by particle attachment and deterministic pathways to crystal size control", J. Am. Chem. Soc. 2015, 137, 13007-13017.
Blasco et al., "Changing the Si distribution in SAPO-11 by synthesis with surfactants improves the hydroisomerization/dewaxing properties", J. Catalysis, 2006, 242, 153-161.
Kim et al., "n-Heptane hydroisomerization over Pt/MFI zeolite nanosheets: Effects of zeolite crystal thickness and platinum location", J. Catalysis, 2013, 301, 187-197.
Charnell, "Gel growth of large crystals of sodium A and sodium X zeolites", J. Crystal Growth, 1971, 8, 291-294.
Chauhan et al., "Synthesis of zeolite ZSM-5: Effect of emulsifiers", Cryst. Res. Tech. 2012, 7, 746-753.
Axnanda et al., "Cationic microemulsion-mediated synthesis of silicalite-1", Microporous and Mesoporous Mater. 2005, 84, 236-246.
Lee et al., "Modifying zeolite particle morphology and size using water/oil /surfactant mixtures as confined domains for zeolite growth", Chem Commun 2004, 680-681.
Carr et al., "Non-ionic-microemulsion mediated growth of zeolite A", Microporous and Mesoporous Mater. 2005, 85, 284-292.
Kim et al., "External Surface Catalytic Sites of Surfactant-Tailored Nanomorphic Zeolites for Benzene Isopropylation to Cumene", ACS Catalysis 2013, 3, 192-195.
Chauhan et al., "Synthesis of small-sized ZSM-5 zeolites employing mixed structure directing agents", Materials Letters 2012, 74, 115-117.
Moteki et al., "From charge density mismatch to a simplified, more efficient seed-assisted synthesis of UZM-4", Chemistry of Materials 2013, 25, 2603-2609.
Mohamed et al., "Synthesis of ZSM-5 zeolite of improved bulk and surface properties via mixed templates", J. Mater. Sci. 2007, 42, 4066-4075.
Wu et al., "Mesoporous SSZ-13 zeolite prepared by a dual-template method with improved performance in the methanol-to-olefins reaction", J. Catalysis 2013, 298, 27-40.
Berger et al., "The synthesis of large crystals of zeolite Y re-visited", Microporous and Mesoporous Materials 2005, 83, 333-344.
Yu et al., "Studies on the dual-templating function of TBA for the formation of ZSM-11 intergrowth morphology", Ind. Eng.Chem. Res. 2015, 54, 2120-2128.
Zhu et al., "Highly mesoporous single-crystalline zeolite beta synthesized using a nonsurfactant cationic polymer as a dual-function template", J. Am Chem. Soc. 2014, 136, 2503-2510.
Lupulescu et al., "Employing molecular modifiers to tailor the crystal morphology of zeolite catalysts", 2012 AIChE Annual Meeting Conference Proceedings, Pittsburgh, 2012. American Institute of Chemical Engineers.

* cited by examiner

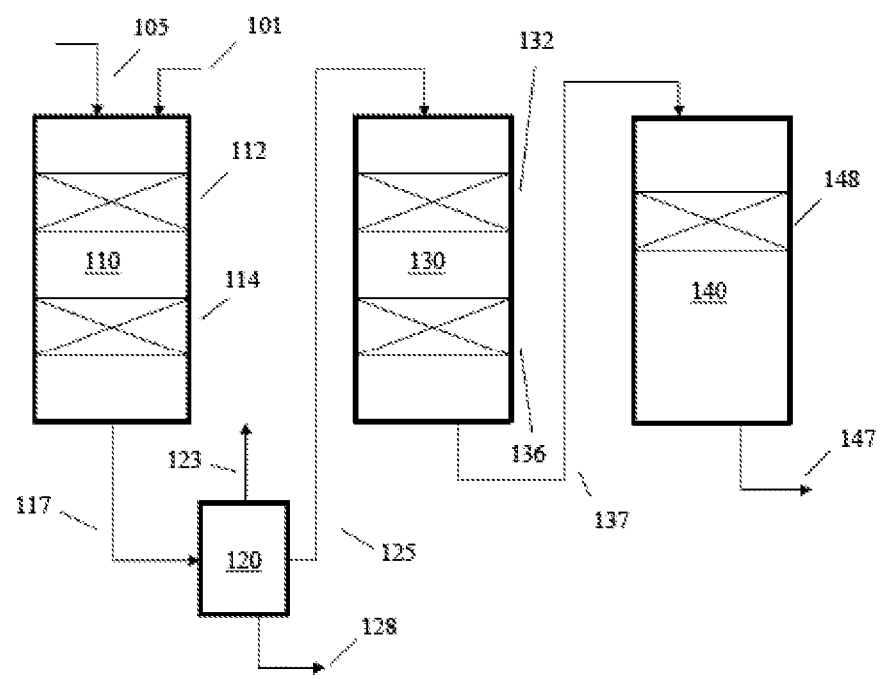

DEWAXING USING A MOLECULAR SIEVE CATALYST

CROSS-REFERENCE TO RELATED APPLICATIONS

This application claims priority to U.S. Provisional Application Ser. No. 62/723,125 filed Aug. 27, 2018, which is herein incorporated by reference in its entirety.

FIELD

Methods are provided for dewaxing of hydrocarbon feeds using a high activity dewaxing catalyst.

BACKGROUND

Molecular sieve crystal structures, such as zeolites, have found a wide range of applications within refinery processes and other processes for manipulating petroleum streams. Some molecular sieve applications are catalytic in nature, while other applications focus on the ability of molecular sieves to selectively adsorb molecules within a gas stream.

One type of zeolite structure used for catalytic processing of petroleum streams is ZSM-48, which is a zeolite of the MRE framework type. As for many zeolites, the composition of the synthesis mixture used to form ZSM-48 (or other MRE framework type zeolites) can have a strong impact on the crystalline structure and/or morphology of the resulting zeolites.

U.S. Pat. No. 6,923,949 describes methods for forming ZSM-48 crystals using synthesis mixtures that include non-ZSM-48 seed crystals. The resulting ZSM-48 crystals can have an X-ray diffraction pattern corresponding to ZSM-48, although the presence of the non-ZSM-48 seed crystals can be detected based on activity tests. For crystals having a silica to alumina ratio of 70 to 1 to 150 to 1, the ZSM-48 crystals formed using non-ZSM-48 seeds are described as being small, irregularly shaped crystals that are free from fibrous morphology. For crystals with a silica to alumina ratio of less than 70 to 1, the ZSM-48 crystals are described as being mixtures of small, irregularly shaped crystals and needle morphology crystals.

U.S. Pat. No. 7,482,300 describes methods for forming ZSM-48 crystals without the use of non-ZSM-48 seeds in the synthesis mixture for forming the crystals. The structure directing agent used for forming the ZSM-48 crystals is described as a hexamethonium salt, such as hexamethonium chloride. The resulting crystals can have a silica to alumina ratio from 70 to 1 to 110 to 1, and are described as being substantially free of fibrous morphology. Preferred ranges are also described for the molar ratio of $OH^-$ to Sift and the molar ratio of structure directing agent (or template) to Sift. The preferred ranges are described as suitable for formation of crystals that are substantially free of needle-like morphology crystals.

U.S. Pat. No. 8,003,074 describes methods for forming ZSM-48 crystals using a diquaternary ammonium salt structure directing agent with a 5 carbon atom alkyl chain between the ammonium ions (a "diquat-5" structure directing agent). Synthesis of ZSM-48 crystals using mixtures of a "diquat-5" structure directing agent and other structure directing agents, such as a "diquat-6" structure directing agent, is also described. Various types of synthesis mixtures are described that result in formation of fibrous and/or needle-like crystal morphologies.

U.S. Pat. No. 4,326,994 describes methods for enhancement of zeolite catalytic activity. The methods include contacting zeolite catalysts with water for a sufficient treating time, temperature, and water partial pressure to bring about increased activity.

A range of other molecular sieves have attracted interest as catalysts for the dewaxing of hydrocarbon feeds to make lube basestocks. Such molecular sieves include ZSM-12, ZSM-22, ZSM-23, ZSM-48, and SAPO-11. A highly siliceous form of zeolite beta has attracted interest as a catalysts for the dewaxing of hydrocarbon feeds to make distillate fuels.

Dewaxing of hydrocarbon feeds such as lubricant base stocks and distillates is an industrial process of great commercial value. In solvent dewaxing, the hydrocarbon feed is contacted with a solvent and then cooled to precipitate waxes, which are then separated. The loss of the waxes represents a reduction in the proportion of the original feed which is available to convert to the desired dewaxed product. In catalytic dewaxing, the hydrocarbon feed is contacted with a catalyst under certain conditions to convert the waxes to non-wax products, either by cracking the waxes or by isomerizing them. While cracking the waxes is effective to remove the waxes from the feed, it typically results in light products which must be separated out and therefore also represents a loss of a proportion of the original feed, with a consequent reduction in the yield of the desired dewaxed product. In contrast, isomerization converts the wax molecules into branched hydrocarbons, which do not crystallize readily but are retained in the product stream. Isomerization therefore offers a path for dewaxing a feed with lower yield loss.

SUMMARY

In one aspect, a method is provided for dewaxing a hydrocarbon feed using a catalyst comprising a molecular sieve, comprising:

exposing the hydrocarbon feed to a catalyst comprising crystals of a molecular sieve under effective dewaxing conditions to form a dewaxed effluent, at least a portion of the crystals of the molecular sieve being crystallized in a process comprising:

a. combining at least a source of a tetravalent element X, a morphology modifier L, and water to form a synthesis mixture;

b. heating said synthesis mixture under crystallisation conditions for a time of about 1 hour to 100 days to form the crystals of the molecular sieve; and c. recovering said crystals of the molecular sieve from the synthesis mixture, wherein the morphology modifier L is selected from the group consisting of sugars, cationic surfactants having a quaternary ammonium group comprising at least one alkyl having at least 12 carbon atoms, nonionic surfactants, anionic surfactants and combinations thereof, and if the synthesis mixture comprises a structure directing agent Q then the morphology modifier L is different from and is present in addition to the structure directing agent Q.

Optionally, the synthesis mixture also comprises a source of hydroxide ions. Optionally, the synthesis mixture also comprises a structure directing agent Q. Optionally, the synthesis mixture also comprises a source of a trivalent element Y. Optionally, the synthesis mixture also comprises a source of a pentavalent element Z. Optionally, the synthesis mixture also comprises a source of halide ions $W^-$. Optionally, the synthesis mixture also comprises a source of alkali metal ions $M^+$ and/or a source of alkali earth metal cations $M^{2+}$. Optionally, the synthesis mixture also comprises one or more other components.

In a further aspect, the invention provides a method for dewaxing a hydrocarbon feed using a catalyst comprising a molecular sieve, comprising:

hydrotreating the feedstock under effective hydrotreating conditions, hydrocracking the feedstock under effective hydrocracking conditions, hydrofinishing the feedstock under effective hydrofinishing conditions, or a combination thereof then exposing the hydrocarbon feed to a catalyst comprising crystals of a molecular sieve under effective dewaxing conditions to form a dewaxed effluent, at least a portion of the crystals of the molecular sieve being crystallized in a process comprising the steps of:
  a. combining at least a source of a tetravalent element X, a morphology modifier L, and water to form a synthesis mixture;
  b. heating said synthesis mixture under crystallisation conditions for a time of about 1 hour to 100 days to form the crystals of the molecular sieve; and
  c. recovering said crystals of the molecular sieve from the synthesis mixture, wherein the morphology modifier L is selected from the group consisting of sugars, cationic surfactants having a quaternary ammonium group comprising at least one alkyl having at least 12 carbon atoms, nonionic surfactants, anionic surfactants and combinations thereof, and if the synthesis mixture comprises a structure directing agent Q then the morphology modifier L is different from and is present in addition to the structure directing agent Q; and hydrofinishing the dewaxed effluent under effective hydrofinishing conditions, the hydrofinishing optionally being performed after separating the dewaxed effluent to form at least one dewaxed diesel boiling range fraction, at least one dewaxed lubricating basestock fraction, or a combination thereof.

BRIEF DESCRIPTION OF THE FIGURES

The FIGURE shows schematically an example of a reaction system for hydroprocessing of a hydrocarbon feed.

DETAILED DESCRIPTION

All numerical values within the detailed description and the claims herein are modified by "about" or "approximately" the indicated value, and take into account experimental error and variations that would be expected by a person having ordinary skill in the art.

Overview

The present inventors recognized the need for a process using dewaxing catalysts which efficiently isomerize hydrocarbon feeds to provide a dewaxed product, such as a base stock. In various aspects, methods are provided for the dewaxing of a hydrocarbon feed using a catalyst comprising a molecular sieve, comprising:

exposing the hydrocarbon feed to a catalyst comprising crystals of a molecular sieve under effective dewaxing conditions to form a dewaxed effluent, at least a portion of the crystals of the molecular sieve being crystallized in a process comprising:

combining a source of a tetravalent element X, a morphology modifier L, water, optionally a source of hydroxide ions, optionally a structure directing agent Q, optionally a source of a trivalent element Y, optionally a source of a pentavalent element Z, optionally a source of halide ions W−, optionally a source of alkali metal ions $M^+$ and/or a source of alkali earth metal cations $M^{2+}$, and optionally one or more other components to form a synthesis mixture;

heating said synthesis mixture under crystallisation conditions for a time of about 1 hour to 100 days to form the crystals of the molecular sieve; and recovering said crystals of the molecular sieve from the synthesis mixture, wherein the morphology modifier L is selected from the group consisting of sugars, cationic surfactants having a quaternary ammonium group comprising at least one hydrocarbyl having at least 12 carbon atoms, nonionic surfactants, anionic surfactants and combinations thereof, and if a structure directing agent Q is present L is different from and is present in addition to the structure directing agent Q.

The present inventors have found that by conducting the synthesis of the molecular sieve in the presence of the morphology modifier L it is possible to influence the crystal growth such that the crystals of molecular sieve have modified crystal sizes and/or modified acidity, as compared to the crystals of the same molecular sieve prepared in the absence of the morphology modifier L. This allows for the production of molecular sieve crystals with novel and desirable properties. The molecular sieve crystals produced by the process of the invention may be smaller than crystals of the same molecular sieve prepared by the same method but in the absence of the morphology modifier L. Without wishing to be bound by theory, the inventors believe that the presence of the morphology modifier L may either change the distribution of trivalent elements such as Al in the crystals and/or change the way in which the crystal terminates such that access to the trivalent element is enhanced. The molecular sieve crystals produced by the process described herein may have increased surface area, especially external surface area, as compared to crystals of the same molecular sieve prepared by the same method but in the absence of the morphology modifier L. The molecular sieve crystals produced by the process described herein may have a greater external surface acidity, as measured for example by collidine adsorption, than crystals of the same molecular sieve prepared by the same method but in the absence of the morphology modifier L. Decreased crystal size and/or increased external surface area and/or increased external acidity can lead to an increase in activity and/or an increase in selectivity of the molecular sieve when used as a component in a catalyst for dewaxing of a hydrocarbon feed.

In particular, it is believed that the catalysts used in the method of the invention show increased isomerization activity, as compared to catalysts in which the molecular sieve has been prepared in the absence of a morphology modifier. In some cases, the production of products having two and three branches per molecule has been found to be enhanced as compared to catalysts in which the molecular sieve has been prepared in the absence of a morphology modifier.

Additionally or alternatively, in various aspects methods are provided for using a dewaxing catalyst formed using a morphology modifier L for production of a lubricant base stock. For example, molecular sieve crystals, such as ZSM-48 crystals, formed using a morphology modifier L (and/or formulated catalysts made using such crystals) can have an increased activity and/or can provide an improved yield during catalytic production of lubricant base stocks. Additionally or alternatively, molecular sieve crystals formed using a morphology modifier (and/or formulated catalysts made using such crystals) can provide improved aromatic saturation during processing of a feed for lubricant base stock production.

Synthesis of Molecular Sieves Using a Morphology Modifier

Methods described herein can be suitable for synthesis of various types of zeolites using synthesis mixtures that contain a morphology modifier and optionally a structure directing agent. Where a structure directing agent is present the morphology modifier is different to and is present in addition to the structure directing agent.

The synthesis mixture can be prepared according to conventional methods. The morphology modifier L may be included in the synthesis mixture at any time while crystallization is ongoing but is preferably combined with the other components before nucleation or crystallization begins. Optionally, the morphology modifier L is combined with other components of the synthesis mixture before the source of the tetravalent element X is added. For example, the water, the source of hydroxide ion (if present), the structure directing agent (if present), the source of a trivalent element Y (if present), the seeds (if present) and any other components can be combined in any order to form a mixture and then the source of the tetravalent element is combined with that mixture.

In the molecular sieves of the invention the tetravalent element X may be Si. Suitable sources of silicon (Si) that can be used to prepare the synthesis mixture include silica; colloidal suspensions of silica, for Ludox®; precipitated silica; alkali metal silicates such as potassium silicate and sodium silicate; tetraalkyl orthosilicates; and fumed silicas such as Aerosil and Cabosil.

The synthesis mixture optionally also contains a source of hydroxide ions, for example, the synthesis mixture may comprise an alkali metal hydroxide such as sodium hydroxide or potassium hydroxide. Hydroxide can also be present as the anion of any charged (organic) structure directing agent or modifier which may be present or by the use of sodium aluminate or potassium aluminate as a source of Y, or by the use of sodium silicate or potassium silicate as the source of X. Sodium or potassium aluminate and silicate can also be used as the source of alkali metal M+.

Optionally, the trivalent element Y is selected from the group consisting of Al, B, Fe and Ga and mixtures thereof. Optionally, Y is selected from B, Ga or Al, or mixtures thereof. Preferably, the trivalent element Y is Al. Suitable sources of trivalent element Y that can be used to prepare the synthesis mixture depend on the element Y that is selected (e.g., boron, aluminum, iron and gallium). In embodiments where Y is boron, sources of boron include boric acid, sodium tetraborate and potassium tetraborate. Optionally, the trivalent element Y is aluminum, and the aluminum source includes aluminum sulfate, aluminum nitrate, aluminum hydroxide, hydrated alumina, such as boehmite, gibbsite, and pseudoboehmite, and mixtures thereof. Other aluminum sources include, but are not limited to, other water-soluble aluminum salts, alkali metal aluminate solids or liquids, aluminum alkoxides, such as aluminum isopropoxide, or aluminum metal, such as aluminum in the form of chips or powders.

Alternatively or in addition to previously mentioned sources of Si and Al, sources containing both Si and Al elements can also be used as sources of Si and Al. Examples of suitable sources containing both Si and Al elements include amorphous silica-alumina gels or dried silica-alumina powders, silica aluminas, clays, such as kaolin, metalkaolin, and zeolites, in particular aluminosilicates such as synthetic faujasite and ultrastable faujasite, for instance USY, beta, or other large to medium pore zeolites. Optionally, the pentavalent element Z, if present, is selected from the group consisting of P and As, and mixtures thereof. Preferably, Z, if present, is P. Suitable sources of phosphorus include one or more sources selected from the group consisting of phosphoric acid; organic phosphates, such as triethyl phosphate, tetraethyl-ammonium phosphate; aluminophosphates; phosphate salts such as alkali metal phosphates, dihydrogen phosphates, hydrogen phosphates and pyrophosphates and mixtures thereof.

Optionally, the halide ion W−, if present, is selected from the group consisting of chloride, bromide, fluoride and mixtures thereof. The source of halide ions may be any compound capable of releasing halide ions in the molecular sieve synthesis mixture. Non-limiting examples of sources of halide ions include salts containing one or several halide ions, such as metal halides, preferably where the metal is sodium, potassium, calcium, magnesium, strontium or barium. Suitable sources of fluoride ion, $F^-$, include HF; ammonium fluoride or tetraalkylammonium fluorides such as tetramethylammonium fluoride or tetraethylammonium fluoride; fluoride-containing salts such as NaF, and KF; compounds of fluoride with the elements X, Y such as $AlF_3$ and $SiF_6$ salts; and/or compounds in which the fluoride ion is present as counterion for a cationic structure directing agent, Q. If the synthesis mixture does not comprise a source of hydroxide ion, then it preferably contains a source of fluoride ion, which can also act as a mineralizing agent. A convenient source of halide ion is HF.

Optionally, the synthesis mixture also contains a source of alkali metal cations $M^+$ and/or alkali earth metal cations $M^{2+}$. If present, the alkali metal cation $M^+$ is preferably selected from the group consisting of $Li^+$, $Na^+$, $K^+$, $Rb^+$ and $Cs^+$ and mixtures thereof. Suitable sources of $Na^+$ include may be a sodium salts such as NaCl, NaBr, NaF or $NaNO_3$; sodium hydroxide, sodium aluminate and mixtures thereof. Suitable sources of K+ include potassium hydroxide, potassium halides such as KCl or KBr, potassium nitrate, potassium aluminate and mixtures thereof. If present, the alkaline earth metal cation is preferably selected from $Mg^{2+}$, $Ca^{2+}$, $Sr^{2+}$, $Ba^{2+}$ and mixtures thereof.

Structure directing agents, Q, are compounds which are known to influence the crystallization of the framework of the molecular sieve so as to promote the formation of a particular desired molecular sieve. For example, tetrapropylammonium hydroxide or bromide is often used to make ZSM-5. In contrast, the role of the morphology modifier, L, is to influence the crystallization to modify the crystal size, the external surface area and/or the external acidity of the molecular sieve as described above, rather than the to influence the identity of the molecular sieve. Where the molecular sieve is one which requires the use of a structure directing agent Q the synthesis mixture will also comprise an effective concentration of the structure directing agent. In that case, the morphology modifier L will be different from and will be present in addition to the structure directing agent Q. ZSM-12, ZSM-22, and ZSM-48 require the use of a structure directing agent. The nature of the structure directing agent Q will depend upon the desired framework type. Suitable structure directing agents are known to the skilled person. The structure directing agent Q may be present in any suitable form, for example as a salt of a halide such as a chloride or bromide, as a hydroxide or as a nitrate. The structure directing agent Q will generally be an organic structure directing agent, for example, an amine such a propylamine, pyrrolidine or pyridine or a nitrogen-containing cation such as a quarternary ammonium cation. Optionally, the ammonium cation does not include any alkyl chain having more than 10 carbon atoms.

For aspects related to synthesis of ZSM-48 (or other MRE framework zeolites as described in the zeolite database maintained by the International Zeolite Association), any convenient structure directing agent suitable for use in a synthesis mixture for formation of ZSM-48 can be used as a dominant structure directing agent. One option can be to use a diquaternary alkylammonium salt with a 6 carbon atom chain between the ammonium ions (diquat-6). Another option can be to use a diquaternary alkylammonium salt with a 5 carbon atom chain between the ammonium ions (diquat-5). Both diquat-5 and diquat-6 are known to be suitable as structure directing agents for formation of ZSM-48, although the resulting ZSM-48 crystals generated by diquat-5 and diquat-6 are typically different. It is believed that mixtures of diquat-5 and diquat-6 tend to produce ZSM-48 crystals having a crystal morphology corresponding roughly to the average of the crystal morphology that would be expected based on use of the individual structure directing agents in a reaction mixture.

The synthesis mixture can have any composition which is suitable for preparing the desired zeolite framework. The following ranges are given as examples of desirable and preferred ranges for each pair of components in the synthesis mixture. Conveniently, the molar ratio of $XO_2:Y_2O_3$ in the synthesis mixture may be in the range of from 2 to infinity (i.e. no Y), in particular from 5 to 500, preferably from 5 to 200. Optionally, in the synthesis mixture the molar ratio of structure directing agent Q: $(XO_2+Y_2O_3+Z_2O_5)$ is in the range of from 0.01 to 1.0, preferably from 0.02 to 0.9, optionally from 0.04 to 0.5. Optionally, in the synthesis mixture the molar ratio of $H_2O$: $(XO_2+Y_2O_3+Z_2O_5)$ is in the range of from 5 to 100. Optionally, in the synthesis mixture the molar ratio of $M^+$: $(XO_2+Y_2O_3+Z_2O_5)$ is in the range of from 0 to 1.2, preferably from 0 to 1.0. Optionally, in the synthesis mixture the molar ratio of $OH^-$: $(XO_2+Y_2O_3+Z_2O_5)$ is in the range of from 0.05 to 1.1, preferably from 0.10 to 1.0. Optionally, in the synthesis mixture the molar ratio of halide-: $(XO_2+Y_2O_3+Z_2O_5)$ is in the range of from 0 to 1, preferably from 0 to 0.5. The reaction mixture may for example have a composition, expressed in terms of mole ratios, as indicated in the following Table 1:

TABLE 1

Optional Composition Ranges for the Synthesis Mixture

| Mole ratio | Useful | Preferred |
| --- | --- | --- |
| $XO_2/Y_2O_3$ | 5 to 500 | 5 to 200 |
| $Q/(XO_2 + Y_2O_3 + Z_2O_5)$ | 0.00 to 1.0 | 0.02 to 0.9 |
| $H_2O/(XO_2 + Y_2O_3 + Z_2O_5)$ | 5 to 100 | 5 to 100 |
| $M^+/(XO_2 + Y_2O_3 + Z_2O_5)$ | 0 to 1.20 | 0 to 1.00 |
| $OH^-/(XO_2 + Y_2O_3 + Z_2O_5)$ | 0.05 to 1.1 | 0.10 to 1.0 |
| Halide$^-/(XO_2 + Y_2O_3 + Z_2O_5)$ | 0 to 1 | 0 to 0.5 |

For example, some directing agents can also serve as a source of $OH^-$ ions in a synthesis mixture. An example of such a secondary directing agent is a tetraalkyl ammonium hydroxide. Tetraalkyl ammonium hydroxides are known as being suitable directing agents for formation of some types of molecular sieves, but are also sufficiently basic to contribute to the $OH^-$ concentration of a synthesis mixture. Thus, in addition to being a secondary structure directing agent, a tetraalkyl ammonium hydroxide can also be used in place of at least a portion of another basic compound or source of hydroxyl ions, such as an alkali hydroxide. Reducing the concentration of alkali hydroxide can be beneficial as some impurity phases are more likely to form with increasing alkali content. For example, increasing the amount of sodium in a synthesis mixture can increase the likelihood and/or amount of formation of Kenyaite (sodium silicate) from a synthesis mixture.

The water may be added in any amount suitable to dissolve the components and to prepare the desired molecular sieve. The synthesis mixture will comprise an aqueous liquid phase and may also comprise some undissolved solid components as well as crystallised molecular sieve. The liquid present in the synthesis mixture is substantially a single phase, typically an aqueous solution, gel phase, slurry, paste, moist powder, comprising less than 5 wt %, optionally less than 2 wt %, optionally less than 1 wt % of water insoluble liquid components. In particular, the liquid present in the synthesis mixture is not an emulsion or a microemulsion. The synthesis may be performed with or without added nucleating seeds. If nucleating seeds are added to the synthesis mixture, the seeds are suitably present in an amount from about 0.01 to 10.0% by weight, based on the synthesis mixture, such as from about 0.01 to 2.0% by weight of the synthesis mixture. The seeds can for instance be of any suitable zeolite, which may be a zeolite having the same or a different framework as the zeolite to be obtained.

The Morphology Modifier L

The morphology modifier L is selected from the group consisting of sugars, cationic surfactants having a quaternary ammonium group comprising at least one hydrocarbyl, preferably alkyl, group having at least 12 carbons atoms, nonionic surfactants, anionic surfactants and combinations thereof. The morphology modifier may be added to the synthesis mixture at any time before crystallization s completed. Optionally, the morphology modifier L is added to the other components of the synthesis mixture before nucleation or crystallization of the crystals begins. Mixtures of two or more morphology modifiers L may also be used and such processes are within the scope of the invention.

The morphology modifier may be a sugar. The sugar may be a monosaccharide or a disaccharide. Suitable monosaccharides include glucose, fructose and galactose, especially fructose. Suitable disaccharides include sucrose, maltose and lactose. The sugar may be a pentose. Alternatively, the sugar may be a hexose.

The morphology modifier L may be a cationic surfactant having a quaternary ammonium group comprising at least one hydrocarbyl having at least 12 carbon atoms. The at least one hydrocarbyl having at least 12 carbon atoms is covalently bound to the nitrogen atom of the quaternary ammonium, and may be branched or linear, preferably linear. The at least one hydrocarbyl optionally has at least 14 carbons atoms, optionally at least 16 carbon atoms, optionally at least 18 carbon atoms. Optionally, the at least one hydrocarbyl has no more than 30 carbon atoms. The alkyl may be saturated or unsaturated, preferably saturated. The cationic surfactant may comprise two hydrocarbyls each having at least 12 carbon atoms bound to the nitrogen atom of the quaternary ammonium group. The other substituents on the nitrogen atom of the quaternary ammonium group are optionally alkyl having from 1 to 8 carbon atoms, optionally from 1 to 4 carbon atoms, such as methyl groups. Each hydrocarbyl may include one or more heteroatoms, optionally selected from selected from oxygen, sulphur, nitrogen and halide.

The morphology modifier L may be a cationic surfactant having a single quaternary ammonium group comprising at least one alkyl having at least 12 carbon atoms. The at least one alkyl having at least 12 carbon atoms is covalently bound to the nitrogen atom of the quaternary ammonium, and may be branched or linear, preferably linear. The at least one alkyl optionally has at least 14 carbons atoms, optionally at least 16 carbon atoms, optionally at least 18 carbon atoms. Optionally, the at least one alkyl has no more than 30 carbon atoms. The alkyl may be saturated or unsaturated, preferably saturated. The cationic surfactant may comprise two alkyls each having at least 12 carbon atoms bound to the nitrogen atom of the quaternary ammonium group. The other substituents on the nitrogen atom of the quaternary ammonium group are optionally alkyl having from 1 to 8 carbon atoms, optionally from 1 to 4 carbon atoms, such as methyl groups.

The cationic surfactant may comprise two or more such quaternary ammonium groups. Alternatively, the cationic surfactant may comprise only a single (that is, no more than one) quaternary ammonium group.

The cationic surfactant may include any suitable anion, such as hydroxide or halide as counterion. $OH^-$, $F^-$, $Cl^-$ and $Br^-$ are preferred counterions.

The morphology modifier L is optionally a cationic surfactant having the formula (1)

$$(R^1)_q(R^2)_{4-q}N^+(X^{n-})_{1/n} \qquad (1)$$

wherein each $R^1$ is independently a $C_1$-$C_6$, optionally a $C_1$ to $C_4$, hydrocarbyl group which may be linear or branched, saturated or unsaturated, preferably linear and saturated and each hydrocarbyl may include one or more heteroatoms, optionally selected from selected from oxygen, sulphur, nitrogen and halide; $R^2$ is a $C_{12}$ to $C_{30}$, optionally $C_{14}$ to $C_{30}$, optionally $C_{16}$ to $C_{30}$, optionally $C_{18}$ to $C_{30}$ hydrocarbyl which may be branched or linear, saturated or unsaturated, preferably linear and saturated, and each hydrocarbyl may include one or more cyclic groups, and/or one or more heteroatoms, optionally selected from selected from oxygen, sulphur, nitrogen and halide; q is 1 or 2, preferably 1; $X^{n-}$ is an anion of valency n. n is preferably 1. $X^{n-}$ is optionally a hydroxide anion or a halide anion, especially a halide anion selected from fluoride, chloride or bromide. $R^1$ is optionally methyl.

Preferably each $R^1$— is independently a $C_1$-$C_6$, optionally a $C_1$ to $C_4$, alkyl group which may be linear or branched, saturated or unsaturated, preferably linear and saturated. Preferably $R^2$ is a $C_{12}$ to $C_{30}$, optionally $C_{14}$ to $C_{30}$, optionally $C_{16}$ to $C_{30}$, optionally $C_{18}$ to $C_{30}$ alkyl group which may be branched or linear, saturated or unsaturated, preferably linear and saturated.

Optionally, the morphology modifier L is a cationic surfactant having the formula (2)

$$(R^3)_3R^4N^+A^- \qquad (2)$$

in which $A^-$ is an anion, preferably hydroxide or halide, and is preferably selected from $OH^-$, $Cl^-$ and $Br^-$, each $R^3$ is independently selected from hydrogen and $C_1$ to $C_4$ alkyl, preferably methyl, and $R^4$ is a $C_{12}$ to $C_{30}$ alkyl group, preferably a $C_{14}$ to $C_{20}$ alkyl group, which may be branched or linear, and be saturated or unsaturated, and optionally contains one or more cyclic groups, and is preferably saturated and linear.

Suitable cationic surfactants include dodecyltrimethylammonium chloride, dodecyltrimethylammonium bromide, hexadecyltrimethylammonium chloride, hexadecyltrimethylammonium bromide, octadecyltrimethylammonium chloride, octadecyltrimethylammonium bromide, hexadecylethyldimethylammonium chloride, and hexadecylethyldimethylammonium bromide.

The morphology modifier L may be a nonionic surfactant. Optionally, the nonionic surfactant is selected from the group consisting of alkyl ethoxylates, alkyl propoxylates, alkylphenol ethoxylates, alkylphenol propoxylates, fatty acid ethoxylates, fatty acid propoxylates, ethoxylated amines, propoxylated amines, ethoxylated amides, propoxylated amides, block copolymers of ethylene oxide and propylene oxide, block copolymers of ethylene oxide and butylene oxide, and fatty acid esters of polyhydroxy compounds such as glycerol and sorbitan. For example, the morphology modifier L may be PEG-dodecyl ether or PEG oleyl ether. The morphology modifier L may be an anionic surfactant. Anionic surfactants comprise an anionic group such as a sulfate, sulfonate, phosphate or carboxylate group, and an alkyl group having at least 8 carbon atoms, optionally at least 10 carbon atoms, optionally at least 12 carbon atoms for example from 14 to 30 carbon atoms, Optionally, the anionic surfactant is an alkyl sulphate, an alkyl sulfonate, an alkyl phosphate or an alkyl carboxylate. Optionally, the anionic surfactant is an alkyl sulfate such as sodium lauryl sulfate.

The molar ratio L:X in the synthesis mixture is optionally in the range of from 0.0001 to 0.10, optionally from 0.0001 to 0.08, optionally from 0.0001 to 0.05, optionally from 0.0001 to 0.03, optionally from 0.001 to 0.025. At lower ratios the concentration of morphology modifier L may be insufficient to cause noticeable change in the morphology of the crystals whereas at higher ratios the concentration of the morphology modifier may be so large as to either inhibit the crystallization so as to significantly reduce the rate of crystallization or to cause another molecular sieve framework to be formed in place of the desired one.

The morphology modifier L is optionally present in the synthesis mixture in a concentration in the range of from 0.01 wt % to 10 wt %, optionally from 0.1 wt % to 5 wt %, optionally from 0.2 wt % to 3 wt %, preferably from 0.5 wt % to 2 wt % based on the weight of the synthesis mixture.

The Crystallization and Recovery

Crystallization can be carried out under either static or stirred conditions in a suitable reactor vessel, such as for example, polypropylene jars or Teflon® bottles, acid digestion vessels, Teflon® lined or stainless steel autoclaves, plough shear mixers, or reaction kettles. The crystallization is typically carried out at a temperature of about 80° C. to about 250° C., optionally 100° C. to about 200° C., optionally about 150° C. to about 170° C., for a time sufficient for crystallization to occur at the temperature used, e.g., from about 1 day to about 100 days, in particular from 1 to 50 days, for example from about 2 days to about 40 days. Thereafter, the synthesized crystals are separated from the mother liquor by any convenient method such as filtration or centrifugation and recovered. Crystals are then dried, for example, under atmospheric conditions, washed with low boiling solvents such as acetone, methanol, ethanol, or propanol, microwave conditions, or dried in an oven at temperatures of up to 150° C.

Calcination

The method optionally includes the step of calcining the crystals recovered in step c) to give the calcined form of the molecular sieve. The conditions of calcination will be chosen to at least partially eliminate any organic residues remaining, such as remaining morphology modifier L and/or any structure directing agent Q (if used) which is typically trapped in the pores of the molecular sieve in its "as-made" form.

The calcining step typically involves heating the zeolite at a temperature of at least about 200° C., preferably at least about 300° C., more preferably at least about 370° C. for at least 1 minute and generally not longer than 20 hours. While subatmospheric pressure can be employed for the thermal treatment, atmospheric pressure is usually desired for reasons of convenience. The thermal treatment can be performed at a temperature up to about 925° C. For instance, the thermal treatment can be conducted at a temperature of from 400 to 600° C., for instance from 500 to 550° C., in the presence of an oxygen-containing gas, for example, in air.

The molecular sieve may also be subjected to an ion-exchange treatment, for example, with aqueous ammonium salts, such as nitrate, chloride and acetate, in order to remove remaining alkali metal cations and/or alkali earth metal cations and to replace them with protons thereby producing the acid form of the molecular sieve. To the extent desired, the original cations of the as-synthesized material, such as alkali metal cations, can be replaced by ion exchange with other cations. Preferred replacing cations can include metal ions, hydrogen ions, hydrogen precursor, e.g., ammonium ions and mixtures thereof. Particularly preferred cations can be those which tailor the catalytic activity for certain hydrocarbon conversion reactions. These can include hydrogen, rare earth metals and metals of Groups IIA, IIIA, IVA, VA, IB, IIB, IIIB, IVB, VB, VIB, VIIB and VIII of the Periodic Table of the Elements.

The ion exchange step may take place after the as made molecular sieve is dried. The ion-exchange step may take place either before or after a calcination step.

The molecular sieve may also be subjected to other treatments such as steaming and/or washing with solvent. Such treatments are well-known to the skilled person and are carried out in order to modify the properties of the molecular sieve as desired.

The Molecular Sieve

The molecular sieve used as catalyst in the method of the invention may be any molecular sieve which is suitable for use in a catalyst for dewaxing hydrocarbon feeds. Optionally, the molecular sieve is selected from the group consisting of ZSM-12, ZSM-22, ZSM-23, ZSM-48, SAPO-11, zeolite beta, and mixtures thereof. Optionally, the molecular sieve is selected from the group consisting of ZSM-12, ZSM-22, ZSM-23, ZSM-48, SAPO-11 and mixtures thereof. Optionally, the molecular sieve is selected from the group consisting of ZSM-12, ZSM-22, ZSM-23, ZSM-48 and mixtures thereof. Optionally, the molecular sieve is ZSM-48.

The molecular sieve made by the process described herein in which a morphology modifier L is included in the synthesis mixture may have an increased external surface area as compared to the same molecular sieve made in the absence of the morphology modifier L. Optionally, the molecular sieve made by the process described herein has an external surface area of at least 1.1 times, optionally at least 1.2 times the external surface area of the same molecular sieve made in the absence of the morphology modifier L.

The molecular sieve made by the process described herein in which a morphology modifier L is included in the synthesis mixture may have an increased external acidity, as measured by collidine absorption, as compared to the same molecular sieve made in the absence of the morphology modifier L. Optionally, the molecular sieve made by the process of the invention has an external acidity of at least 1.1 times, optionally at least 1.2, times the external acidity of the same molecular sieve made in the absence of the morphology modifier L.

Alternatively, the molecular sieve made by the process described herein in which a morphology modifier L is included in the synthesis mixture has a reduced external surface area and/or a reduced external acidity as compared to the same molecular sieve made in the absence of the morphology modifier L.

By selecting the appropriate morphology modifier L and an appropriate concentration of that morphology modifier the skilled person can prepare molecular sieves having a range of external surface area, external acidity and/or crystal size.

The molecular sieve described herein in which a morphology modifier L is included in the synthesis mixture preferably has a ratio of external surface area to internal surface area of greater than 1.20 and/or has a ratio of external acidity, as measured by collidine absorption, to internal acidity, as measured by ammonia absorption, is greater than 1.50.

In some aspects, the molecular sieve made by the process described herein in either a calcined or as-synthesized form can form agglomerates of small crystals that may have crystal sizes in the range of 0.01 to 1 μm. These small crystals can be desirable for they generally lead to greater activity. Smaller crystals can mean greater surface area which leads to a greater number of active catalytic sites per given amount of catalyst.

Optionally the molecular sieve described herein in which a morphology modifier L is included in the synthesis mixture contains Si and Al and has a $SiO_2:Al_2O_3$ molar ratio of greater than 2:1, optionally greater than 5:1, optionally greater than 10:1, optionally greater than 30:1, optionally greater than 100:1, and optionally greater than 150:1. The $SiO_2:Al_2O_3$ molar ratio is optionally less than 500, optionally less than 300, or optionally less than 200. The molecular sieve crystals, especially ZSM-48, after removal of the structural directing agent can have a particular molar composition according to the general formula: $(n)SiO_2:Al_2O_3$ where n is from 65 to 110, or 70 to 100, or 80 to 95. In another aspect, n can be at least 65, or at least 70, or at least 80, or at least 85, or at least 90. Additionally or alternatively, n can be 110 or less, or 100 or less, or 95 or less. Additionally or alternatively, Si may be replaced by Ge and Al may be replaced by Ga, B, Fe, Ti, V, and Zr. More generally, the molar composition can include a ratio of $(n)SiO_2:Al_2O_3$ where n is from 50 to 200.

While the presence of aluminium within the framework structure does contribute acidic sites to the catalyst it also is associated with a reduction in thermal stability of the zeolite.

The molecular sieve optionally has a degree of crystallinity of at least 80%, optionally at least 90%, preferably at least 95% and most preferably at least 98%. In one embodiment the molecular sieve is essentially pure crystalline material. The degree of crystallinity may be calculated via x-ray diffraction (XRD).

The molecular sieve may be in calcined form. The molecular sieve crystals can be "as-synthesized" crystals that still contain the organic template, or the crystals can be calcined crystals, such as K-form molecular sieve crystals or Na-form molecular sieve crystals, or the crystals can be calcined and ion-exchanged crystals, such as H-form molecular sieve crystals.

The molecular sieve of the invention in its calcined, acid form preferably has an external acidity which is at least 1.10 times, more preferably at least 1.30 times, and in some case at least 1.50 times the external acidity of a molecular sieve made using an equivalent process except that the synthesis mixture does not include any morphology modifier L. The external acidity may be measured by collidine adsorption.

The molecular sieve may in its calcined, acid form, have an external surface area which is at least 1.10 times, more preferably at least 1.20 times, and in some cases 1.30 times the external surface area of a molecular sieve made using an equivalent process except that the synthesis mixture does not include any morphology modifier L. The external surface area may be measured by BET.

The molecular sieve in its calcined form preferably has a ratio of external surface area to internal surface area of greater than 1.20 and/or has a ratio of external acidity, as measured by collidine absorption, to internal acidity, as measured by ammonia absorption, of greater than 1.50.

The molecular sieve is preferably dehydrated, at least partially. This can be done by heating to a temperature in the range of about 100° C. to about 500° C., such as about 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the molecular sieve in a vacuum, but a longer time is required to obtain a sufficient amount of dehydration.

Once the molecular sieve has been synthesized, it can be formulated into a catalyst composition by combination with other materials, such as binders and/or matrix materials that provide additional hardness or catalytic activity to the finished catalyst. These other materials can be inert or catalytically active materials.

In particular, it may be desirable to incorporate the molecular sieve of the present invention or manufactured by the process described herein with another material that is resistant to the temperatures and other conditions employed in organic conversion processes. Such materials include synthetic or naturally occurring zeolites as well as inorganic materials such as clays, silica and/or metal oxides such as alumina, yttria, zirconia, gallium oxide, zinc oxide and mixtures thereof. The metal oxides may be either naturally occurring or in the form of gelatinous precipitates or gels including mixtures of silica and metal oxides. Naturally occurring clays which may be used include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or after being subjected to calcination, acid treatment or chemical modification. These binder materials are resistant to the temperatures and other conditions, e.g., mechanical attrition, which occur in various hydrocarbon conversion processes. Thus the molecular sieve of the present invention or manufactured by the process of the present invention may be used in the form of an extrudate with a binder. They are typically bound by forming a pill, sphere, or extrudate. The extrudate is usually formed by extruding the molecular sieve, optionally in the presence of a binder, and drying and calcining the resulting extrudate. Further treatments such as steaming, addition of catalytic metal or metals, and/or ion exchange may be carried out as required. In some aspects, the molecular sieve can be bound with a low surface area binder, so that the binder surface area of the bound catalyst is 100 $m^2/g$ or less, or 80 $m^2/g$ or less, or 70 $m^2/g$ or less.

Binders may suitably serve as diluents to control the amount of conversion in a given process so that products can be obtained in an economic and orderly manner without employing other means for controlling the rate of reaction. These materials may be incorporated into naturally occurring clays, e.g., bentonite and kaolin, to improve the crush strength of the catalyst under commercial operating conditions.

In addition to the foregoing materials, the molecular sieve of the present invention can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of molecular sieve and inorganic oxide matrix may vary widely, with the molecular sieve content ranging from about 1 to about 100 percent by weight and more usually, particularly when the composite is prepared in the form of extrudates, in the range of about 2 to about 95 weight percent, optionally from about 2 to about 90 weight percent of the composite.

Molecular sieve crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 wt % to 30 wt. %, based on the weight of the catalyst. For example, the amount of hydrogenation metals can be at least 0.1 wt %, or at least 0.3 wt %, or at least 0.5 wt %, or at least 0.75 wt %, or at least 1.0 wt %, or at least 1.5 wt %, or at least 2 wt %, or at least 5 wt %. Additionally or alternately, the amount of hydrogenation metals can be 30 wt % or less, such as 20 wt % or less, or 15 wt % or less, or 10 wt % or less, or 5 wt % or less, or 2 wt % or less. In aspects where the hydrogenation metal(s) are selected to be one or more noble metals, the amount of hydrogenation metals can preferably be 2 wt % or less, such as 1.5 wt % or less, or 1.0 wt % or less. Methods of loading metal onto the catalyst are well known and include, for example, impregnation of the catalyst with a metal salt of the hydrogenation component and heating. The catalyst containing hydrogenation metal may also be sulfided prior to use. The catalyst may also be exposed to a post-synthesis treatment prior to use. For example, the catalyst may be steamed prior to use. Examples of suitable conditions for using steaming as a post-synthesis treatment can include steaming a catalyst for 1 hour to 72 hours at a temperature of 200° F. (93° C.) to 1500° F. (815° C.). The amount of water vapor present during the steaming can be any convenient percentage of the total gas phase environment, such as about 0.1 to 100 mole percent of the gas phase environment.

The molecular sieve crystals, for example, ZSM-48 crystals, have an Alpha value of at least 10 according to an embodiment of the present invention, or at least 20 according to another embodiment of the present invention, or at least 30 according to another embodiment of the invention. Additionally or alternately, the alpha value can be 250 or less. The alpha value test is a measure of the cracking activity of a catalyst and is described in U.S. Pat. No. 3,354,078 and in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395.

The Hydrocarbon Feed

A wide range of petroleum and chemical feedstocks can be hydroprocessed in reaction systems that include a dewaxing catalyst formed using a molecular sieve made using a morphology modifier as described herein, according to various embodiments of the invention. Suitable hydrocarbon feeds include, for example, without limitation, whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

One way of defining a hydrocarbon feed is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil.

Typical hydrocarbon feeds include, for example, feeds with an initial boiling point of at least 400° F. (204° C.), or at least 650° F. (343° C.), or at least 700° F. (371° C.), or at least 750° F. (399° C.). Alternatively, a feed may be characterized using a T5 boiling point, such as a feed with a T5 boiling point of at least 400° F. (204° C.), or at least 650° F. (343° C.), or at least 700° F. (371° C.), or at least 750° F. (399° C.). In some aspects, the final boiling point of the feed can be at least 1100° F. (593° C.), such as at least 1150° F. (621° C.) or at least 1200° F. (649° C.). The feed may be a naphtha fraction having a T5 boiling point of at least 400° F. (204° C.) and an end boiling point of no more than 350° F. (177° C.). In other aspects, a feed may be used that does not include a large portion of molecules that would traditionally be considered as vacuum distillation bottoms. For example, the feed may correspond to a vacuum gas oil feed that has already been separated from a traditional vacuum bottoms portion. Such feeds include, for example, feeds with a final boiling point of 1150° F. (621° C.) or less, or 1100° F. (593° C.) or less, or 1050° F. (566° C.) or less. Alternatively, a feed may be characterized using a T95 boiling point, such as a feed with a T95 boiling point of 1150° F. (621° C.) or less, or 1100° F. (593° C.) or less, or 1050° F. (566° C.) or less. An example of a suitable type of feedstock is a wide cut vacuum gas oil (VGO) feed, with a T5 boiling point of at least 700° F. (371° C.) and a T95 boiling point of 1100° F. or less. Optionally, the initial boiling point of such a wide cut VGO feed can be at least 700° F. and/or the final boiling point can be at least 1100° F. It is noted that feeds with still lower initial boiling points and/or T5 boiling points may also be suitable.

In embodiments involving an initial sulfur removal stage prior to hydrocracking, the sulfur content of the hydrocarbon feed can be at least 300 ppm by weight of sulfur, or at least 1000 wppm, or at least 2000 wppm, or at least 4000 wppm, or at least 10,000 wppm, or at least 20,000 wppm. In other embodiments, including some embodiments where a previously hydrotreated and/or hydrocracked feed is used, the sulfur content can be 2000 wppm or less, or 1000 wppm or less, or 500 wppm or less, or 100 wppm or less.

In this discussion, the distillate boiling range is defined as 350° F. (177° C.) to 700° F. (371° C.). Distillate boiling range products can include products suitable for use as kerosene products (including jet fuel products) and diesel products, such as premium diesel or winter diesel products. The lubricant boiling range is defined as 700° F. (371° C.) to 950° F. (482° C.). The naphtha boiling range is defined as 100° F. (37° C.) to 350° F. (177° C.).

Group I basestocks are defined as basestocks with less than 90 wt % saturated molecules and/or at least 0.03 wt % sulfur content. Group I basestocks also have a viscosity index (VI) of at least 80 but less than 120. Group II basestocks contain at least 90 wt % saturated molecules and less than 0.03 wt % sulfur. Group II basestocks also have a viscosity index of at least 80 but less than 120. Group III basestocks contain at least 90 wt % saturated molecules and less than 0.03 wt % sulfur, with a viscosity index of at least 120. In addition to the above formal definitions, some Group I basestocks may be referred to as a Group I+ basestock, which corresponds to a Group I basestock with a VI value of 103 to 108. Some Group II basestocks may be referred to as a Group II+ basestock, which corresponds to a Group II basestock with a VI of at least 113. Some Group III basestocks may be referred to as a Group III+ basestock, which corresponds to a Group III basestock with a VI value of at least 130.

Example of Reaction System for Hydroprocessing

In the discussion herein, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In the discussion herein, reference will be made to a hydroprocessing reaction system. The hydroprocessing reaction system corresponds to the one or more stages, such as two stages and/or reactors and an optional intermediate separator, that are used to expose a feed to a plurality of catalysts under hydroprocessing conditions. The plurality of catalysts can be distributed between the stages and/or reactors in any convenient manner, with some preferred methods of arranging the catalyst described herein.

Various types of hydroprocessing can be used in the production of lubricant basestocks, including production of lubricant basestocks as one of several products generated during a fuels hydrocracking process. Typical processes include a hydrocracking process to provide uplift in the viscosity index (VI) of the feed. The hydrocracked feed can then be dewaxed to improve cold flow properties, such as pour point or cloud point. The hydrocracked, dewaxed feed can then be hydrofinished, for example, to remove aromatics from the lubricant base stock product. This can be valuable for removing compounds that are considered hazardous under various regulations. In addition to the above, a preliminary hydrotreatment and/or hydrocracking stage can also be used for contaminant removal.

The FIGURE shows an example of a reaction system for hydroprocessing of a feed for fuels and/or lubricant basestock production. In the example shown in the FIGURE, a suitable feed 105 can be introduced into a first reactor (or reactors) 110. Hydrogen can also be introduced at various locations within the reaction system, such as hydrogen-containing stream 101. Reactor 110 is schematically shown as including at least one bed 112 of hydrotreating catalyst and at least one bed 114 of hydrocracking catalyst. Either hydrotreating catalyst bed (or beds) 112 or hydrocracking bed (or beds) 114 can be optional. After exposing the feed to the hydrotreating and/or hydrocracking catalyst under effective conditions, the resulting first effluent 117 can be passed into a separator 120. In some aspects, separator 120 can be a gas-liquid type separator for removing contaminant gases 123 generated during hydrotreatment and/or hydrocracking, such as $H_2S$ or $NH_3$. This can allow subsequent stages or catalyst beds in the reaction system to operate as "sweet" reaction stages. In other aspects, separator 120 can allow for separation of liquid hydrocarbon products 128 from the effluent that are below a desired cut point. For example, for a system for lubricant basestock production, separator 120 can allow for separation of both diesel and naphtha boiling range compounds, optionally as one or more separate streams, such as one or more diesel streams, one or more kerosene or jet streams, and/or one or more naphtha streams. As another example, for a system for diesel fuel production, separator 120 might separate out diesel and lower boiling range compounds, or separator 120 may separate out naphtha boiling range compounds while retaining diesel with the primary process flow.

After passing through separator 120, the remaining portion 125 of the effluent can be passed into a second reactor (or reactors) 130. In the example shown in the FIGURE, reactor 130 includes at least one (optional) bed 132 of a hydrotreating and/or hydrocracking catalyst and at least one bed 136 of a dewaxing catalyst. The dewaxing catalyst bed 136 can include at least a portion of a catalyst as described herein. The resulting dewaxed effluent 137 can then be passed into a third reactor (or reactors) 140 for exposure to at least one (optional) bed 148 of hydrofinishing and/or aromatic saturation catalyst. Either the dewaxed effluent 137 or the hydrofinished effluent 947 can be fractionated (not shown) in order to form one or more product streams, such as lubricant basestocks, distillate fuel fractions, or naphtha fuel fractions.

Additional details regarding suitable conditions for the various types of hydroprocessing are provided below.

Hydrotreatment Conditions

Hydrotreatment can typically be used to reduce the sulfur, nitrogen, and aromatic content of a feed. The catalysts used for hydrotreatment can include conventional hydroprocessing catalysts, for example those that comprise at least one Group VIII non-noble metal (Columns 8-10 of IUPAC periodic table), such as Fe, Co, and/or Ni, optionally Co and/or Ni; and at least one Group VI metal (Column 6 of IUPAC periodic table), such as Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. More generally, any convenient size, shape, and/or pore size distribution for a catalyst suitable for hydrotreatment of a distillate (including lubricant basestock) boiling range feed in a conventional manner may be used. It is noted that more than one type of hydroprocessing catalyst can be used in one or multiple reaction vessels.

The at least one Group VIII non-noble metal, in oxide form, can be present in an amount ranging from 2 wt % to 40 wt %, or from 4 wt % to 15 wt %. The at least one Group VI metal, in oxide form, can be present in an amount ranging from 2 wt % to 70 wt %, or for supported catalysts from 6 wt % to 40 wt % or from 10 wt % to 30 wt %. These weight percents are based on the total weight of the catalyst. Suitable metal catalysts can include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. In aspects where the treat gas stream introduced into a reaction stage contains components other than hydrogen, the treat gas can contain at least 50 vol. %, or at least 75 vol. % hydrogen, or at least 90 vol % hydrogen, or at least 95 vol % hydrogen, or at least 99 vol % hydrogen.

Hydrogen can be supplied at a rate of from 100 SCF/B (standard cubic feet of hydrogen per barrel of feed) (17 $Nm^3/m^3$) to 1500 SCF/B (253 $Nm^3/m^3$). Preferably, the hydrogen is provided in a range of from 200 SCF/B (34 $Nm^3/m^3$) to 1200 SCF/B (202 $Nm^3/m^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.7 MPag); liquid hourly space velocities (LHSV) of 0.1 $hr^{-1}$ to 10 $hr^{-1}$; and hydrogen treat rates of 200 scf/B (35.6 $m^3/m^3$) to 10,000 scf/B (1781 $m^3/m^3$), or 500 (89 $m^3/m^3$) to 10,000 scf/B (1781 $m^3/m^3$).

Hydrocracking Conditions

In various aspects, the hydrocracking reaction conditions can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of the fuels hydrocracker or other reaction system that is used to hydroprocess the lower boiling portion of the feed from the vacuum distillation unit. Suitable amounts of conversion of molecules boiling above 700° F. to molecules boiling below 700° F. include converting at least 25% of the 700° F.+ portion of the feedstock to the stage(s) of the reaction system, or at least 40% of the 700° F.+ portion, or at least 50%, or at least 60%, or at least 70%, or at least 75%. Additionally or alternately, the amount of conversion for the reaction system can be 85% or less, or 80% or less, or 75% or less, or 70% or less, or 60% or less, or 50% or less. Each of the above lower bounds on the amount of conversion is explicitly contemplated in conjunction with each of the above upper bounds. Still larger amounts of conversion may also produce a suitable hydrocracker bottoms for forming lubricant basestocks, but such higher conversion amounts will also result in a reduced yield of lubricant basestocks. Reducing the amount of conversion can increase the yield of lubricant basestocks, but reducing the amount of conversion to below the ranges noted above may result in hydrocracker bottoms that are not suitable for formation of Group II, Group II+, or Group III lubricant basestocks.

In order to achieve a desired level of conversion, a reaction system can include at least one hydrocracking catalyst. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.25 Angstroms or less. Additionally or alternately, the catalyst can be a low acidity molecular sieve, such as a USY zeolite with a Si to Al ratio of at least 20, and preferably at least 40 or 50. Zeolite Beta is another example of a potentially suitable hydrocracking catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various aspects, the conditions selected for hydrocracking for fuels production and/or lubricant base stock production can depend on the desired level of conversion, the level of contaminants in the input feed to a hydrocracking stage, and potentially other factors. For example, hydrocracking conditions in a first stage (such as a sour stage) and/or a second stage (such as a sweet stage) can be selected to achieve a desired level of conversion in the reaction system. A hydrocracking process in the first stage (or otherwise under sour conditions) can be carried out at temperatures of 550° F. (288° C.) to 840° F. (449° C.), hydrogen partial pressures of from 250 psig to 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 $m^3/m^3$ to 1068 $m^3/m^3$ (1200 SCF/B to 6000 SCF/B). The LHSV relative to only the hydrocracking catalyst can be from 0.25 $h^{-1}$ to 50 $h^{-1}$, such as from 0.5 $h^{-1}$ to 20 $h^{-1}$, and preferably from 1.0 $h^{-1}$ to 4.0 $h^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less. Optionally, the distillate fuel range can be extended to include additional kerosene, such as by selecting a lower end cut point temperature of at least 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant basestocks. In such aspects, the portion boiling above the distillate fuel range is subjected to further hydroprocessing in a second hydroprocessing stage.

A hydrocracking process in a second stage (or otherwise under non-sour conditions) can be performed under conditions similar to those used for a first stage hydrocracking process, or the conditions can be different. In an embodiment, the conditions in a second stage can have less severe conditions than a hydrocracking process in a first (sour) stage. The temperature in the hydrocracking process can be 40° F. (22° C.) less than the temperature for a hydrocracking process in the first stage, or 80° F. (44° C.) less, or 120° F. (66° C.) less. The pressure for a hydrocracking process in a second stage can be 100 psig (690 kPa) less than a hydrocracking process in the first stage, or 200 psig (1380 kPa) less, or 300 psig (2070 kPa) less. Additionally or alternately, suitable hydrocracking conditions for a second (non-sour) stage can include, but are not limited to, conditions similar to a first or sour stage. Suitable hydrocracking conditions can include temperatures of 550° F. (288° C.) to 840° F. (449° C.), hydrogen partial pressures of from 250 psig to 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 $m^3/m^3$ to 1068 $m^3/m^3$ (1200 SCF/B to 6000 SCF/B). The liquid hourly space velocity can vary depending on the relative amount of hydrocracking catalyst used versus dewaxing catalyst. Relative to the combined amount of hydrocracking and dewaxing catalyst, the LHSV can be from 0.2 $h^{-1}$ to 10 $h^{-1}$, such as from 0.5 $h^{-1}$ to 5 $h^{-1}$ and/or from 1 $h^{-1}$ to 4 $h^{-1}$. Depending on the relative amount of hydrocracking catalyst and dewaxing catalyst used, the LHSV relative to only the hydrocracking catalyst can be from 0.25 $h^{-1}$ to 50 $h^{-1}$, such as from 0.5 $h^{-1}$ to 20 $h^{-1}$, and preferably from 1.0 $h^{-1}$ to 4.0 $h^{-1}$.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

Catalytic Dewaxing Process

In the dewaxing process of the invention, the dewaxing catalyst may, for example, be located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst. In still other aspects, the dewaxing catalyst can be used in a catalyst bed prior to (i.e., upstream relative to the process flow) at least one bed of hydrotreating and/or hydrocracking catalyst.

In various aspects, at least a portion of the dewaxing catalyst can correspond to a molecular sieve catalyst synthesized using a morphology modifier L, as described herein. The molecular sieve is preferably selected from the group consisting of ZSM-12, ZSM-22, ZSM-23, ZSM-48, SAPO-11, zeolite beta, and mixtures thereof. Optionally, the molecular sieve is selected from the group consisting of ZSM-12, ZSM-22, ZSM-23, ZSM-48, SAPO-11 and mixtures thereof. Optionally, the molecular sieve is selected from the group consisting of ZSM-12, ZSM-22, ZSM-23, ZSM-48 and mixtures thereof. Optionally, the molecular sieve is ZSM-48. Such a dewaxing catalyst can be used alone, or in conjunction with one or more other additional dewaxing catalysts.

Additional suitable dewaxing catalysts can include molecular sieves such as crystalline aluminosilicates (zeolites). In an embodiment, the molecular sieve can comprise, consist essentially of, or be ZSM-5, ZSM-11, ZSM-22, ZSM-23, ZSM-35, ZSM-48, zeolite Beta, TON (Theta-1), or a combination thereof, for example ZSM-23 and/or ZSM-48, or ZSM-48 and/or zeolite Beta. Optionally, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22; for example EU-2, EU-11, ZBM-30, ZSM-48, or ZSM-23; such as ZSM-48. Note that a zeolite having the ZSM-23 structure with a silica to alumina ratio of from 20:1 to 40:1 can sometimes be referred to as SSZ-32. Other molecular sieves that are isostructural with the above materials include NU-10, EU-13, KZ-1, and NU-23. Optionally, the additional dewaxing catalyst(s) can include a binder for the molecular sieve, such as alumina, titania, silica, silica-alumina, zirconia, or a combination thereof, for example alumina and/or titania or silica and/or zirconia and/or titania.

In some aspects, the additional dewaxing catalyst(s) used in processes according to the disclosure can be catalysts with a low ratio of silica to alumina. For example, for ZSM-48, the ratio of silica to alumina in the zeolite can be less than 200:1, such as less than 110:1, or less than 100:1, or less than 90:1, or less than 75:1. In various embodiments, the ratio of silica to alumina can be from 50:1 to 200:1, such as 60:1 to 160:1, or 70:1 to 100:1.

In various aspects, the additional dewaxing catalyst(s) can further include a metal hydrogenation component. The metal hydrogenation component can typically be a Group VI and/or a Group VIII metal, such as a Group VIII noble metal. For example, the metal hydrogenation component can be Pt, Pd, or a mixture thereof. In an alternative aspect, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to an additional catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in an additional dewaxing catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For aspects where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The additional dewaxing catalysts useful in processes according to the disclosure can also include a binder. In some aspects, the dewaxing catalysts can be formulated using a low surface area binder, a low surface area binder represents a binder with a surface area of 100 m²/g or less, or 80 m²/g or less, or 70 m²/g or less. The amount of zeolite in a catalyst formulated using a binder can be from 30 wt % zeolite to 90 wt % zeolite relative to the combined weight of binder and zeolite. Preferably, the amount of zeolite is at least 50 wt % of the combined weight of zeolite and binder, such as at least 60 wt % or from 65 wt % to 80 wt %.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

Effective dewaxing process conditions in the catalytic dewaxing step can include a temperature of from 200 to 450° C., preferably 270 to 400° C., a hydrogen partial pressure of from 1.8 MPag to 34.6 MPag (250 psig to 5000 psig), preferably 4.8 MPag to 20.7 MPag, and a hydrogen treat gas rate of from 35.6 m³/m³ (200 SCF/B) to 1781 m³/m³ (10,000 scf/B), preferably 178 m³/m³ (1000 SCF/B) to 890.6 m³/m³ (5000 SCF/B). In still other embodiments, the conditions can include temperatures in the range of 600° F. (343° C.) to 815° F. (435° C.), hydrogen partial pressures of from 500 psig to 3000 psig (3.6 MPag-20.7 MPag), and hydrogen treat gas rates of from 213 m³/m³ to 1068 m³/m³ (1200 SCF/B to 6000 SCF/B). These latter conditions may be suitable, for example, if the dewaxing stage is operating under sour conditions. The liquid hourly space velocity (LHSV) can be from 0.2 h$^{-1}$ to 10 h$^{-1}$, such as from 0.5 h$^{-1}$ to 5 h$^{-1}$ and/or from 1 h$^{-1}$ to 4 h$^{-1}$.

Additionally or alternately, the conditions for dewaxing can be selected based on the conditions for a preceding reaction in the stage, such as hydrocracking conditions or hydrotreating conditions. Such conditions can be further modified using a quench between previous catalyst bed(s) and the bed for the dewaxing catalyst. Instead of operating the dewaxing process at a temperature corresponding to the exit temperature of the prior catalyst bed, a quench can be used to reduce the temperature for the hydrocarbon stream at the beginning of the dewaxing catalyst bed. One option can be to use a quench to have a temperature at the beginning of the dewaxing catalyst bed that is the same as the outlet temperature of the prior catalyst bed. Another option can be to use a quench to have a temperature at the beginning of the dewaxing catalyst bed that is at least 10° F. (6° C.) lower than the prior catalyst bed, or at least 20° F. (11° C.) lower, or at least 30° F. (16° C.) lower, or at least 40° F. (21° C.) lower.

As still another option, the dewaxing catalyst in the final reaction stage can be mixed with another type of catalyst, such as hydrocracking catalyst, in at least one bed in a reactor. As yet another option, a hydrocracking catalyst and a dewaxing catalyst can be co-extruded with a single binder to form a mixed functionality catalyst.

Hydrofinishing and/or Aromatic Saturation Process

Optionally, a hydrofinishing and/or aromatic saturation stage can also be provided. The hydrofinishing and/or aromatic saturation can occur after the last hydrocracking or dewaxing stage. The hydrofinishing and/or aromatic saturation can occur either before or after fractionation. If hydrofinishing and/or aromatic saturation occurs after fractionation, the hydrofinishing can be performed on one or more portions of the fractionated product, such as being performed on the bottoms from the reaction stage (i.e., the hydrocracker bottoms). Alternatively, the entire effluent from the last hydrocracking or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing. Typically a hydrofinishing and/or aromatic saturation process will be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction.

Hydrofinishing conditions can include temperatures from 125° C. to 425° C., preferably 180° C. to 280° C., a hydrogen partial pressure from 500 psig (3.4 MPa) to 3000 psig (20.7 MPa), preferably 1500 psig (10.3 MPa) to 2500 psig (17.2 MPa), and liquid hourly space velocity from 0.1 hr$^{-1}$ to 5 hr$^{-1}$ LHSV, preferably 0.5 hr$^{-1}$ to 2.0 hr$^{-1}$. Additionally, a hydrogen treat gas rate of from 35.6 m³/m³ to 1781 m³/m³ (200 SCF/B to 10,000 SCF/B) can be used.

After hydroprocessing, the bottoms from the hydroprocessing reaction system can have a viscosity index (VI) of at least 95, such as at least 105 or at least 110. The amount of saturated molecules in the bottoms from the hydroprocessing reaction system can be at least 90%, while the sulfur content of the bottoms is less than 300 wppm. Thus, the bottoms from the hydroprocessing reaction system can be suitable for use as a Group II, Group II+, or Group III lubricant basestock.

Additional Embodiments

Additionally or alternatively, the present disclosure can include one or more of the following embodiments.

Embodiment 1

A method for dewaxing a hydrocarbon feed using a catalyst comprising a molecular sieve, comprising:

exposing the hydrocarbon feed to a catalyst comprising crystals of a molecular sieve under effective dewaxing conditions to form a dewaxed effluent, at least a portion of the crystals of the molecular sieve being crystallized in a process comprising the steps of:

combining a source of a tetravalent element X, a morphology modifier L, water, optionally a source of hydroxide ions, optionally a structure directing agent Q, optionally a source of a trivalent element Y, optionally a source of a pentavalent element Z, optionally a source of halide ions W—, optionally a source of alkali metal ions $M^+$ and/or a source of alkali earth metal cations M2+, and optionally one or more other components to form a synthesis mixture;

heating said synthesis mixture under crystallisation conditions for a time of about 1 hour to 100 days to form the crystals of the molecular sieve; and recovering said crystals of the molecular sieve from the synthesis mixture, wherein the morphology modifier L is selected from the group consisting of sugars, cationic surfactants having a quaternary ammonium group comprising at least one alkyl having at least 12 carbon atoms, nonionic surfactants, anionic surfactants and combinations thereof, and if a structure directing agent Q is present L is different from and is present in addition to the structure directing agent Q.

Embodiment 2

The method of Embodiment 1, wherein the catalyst has an alpha value of at least 125.

Embodiment 3

The method of Embodiment 1 or 2, wherein the catalyst has been calcined.

Embodiment 4

The method of any of the above embodiments, wherein the catalyst further comprises a hydrogenation metal comprising Pt, Pd, Ni, W, Co, Mo, or a combination thereof, the amount of hydrogenation metal being 0.1 wt % to 20 wt %.

Embodiment 5

The method of any of the above embodiments, wherein the catalyst further comprises a binder, a surface area of the binder in the bound catalyst being 150 m2/g or less.

Embodiment 6

The method of any of the above embodiments, wherein the effective dewaxing conditions comprise a temperature of from 200 to 450° C., a hydrogen partial pressure of from 1.8 MPag to 34.6 MPa (250 psig to 5000 psig), and a hydrogen treat gas rate of from 35.6 m3/m3 (200 SCF/B) to 1781 m3/m3 (10,000 scf/B).

Embodiment 7

The method of any of the above embodiments, wherein the structure directing agent Q comprises diquat-5, diquat-6, or a combination thereof.

Embodiment 8

The method of any of the above embodiments, wherein the molar ratio L:X in the synthesis mixture is in the range of from 0.001 to less than 0.03.

Embodiment 9

The method of any of the above embodiments, wherein the morphology modifier L is a cationic surfactant having a single quaternary ammonium group, and wherein that single ammonium group comprises at least one C12 to C30 alkyl group bonded to the quaternary ammonium group.

Embodiment 10

The method of any of the above embodiments, wherein the morphology modifier L is a cationic surfactant having the formula (1)

$$(R1)_q(R2)_{4-q}N^+(X^{n-})_{1/n} \tag{1}$$

wherein each R1 is independently a C1-C6, optionally a C1 to C4, hydrocarbyl group which may be linear or branched, saturated or unsaturated, preferably linear and saturated and each hydrocarbyl may include one or more heteroatoms, optionally selected from selected from oxygen, sulphur, nitrogen and halide; R2 is a C12 to C30, optionally C14 to C30, optionally C16 to C30, optionally C18 to C30 hydrocarbyl which may be branched or linear, saturated or unsaturated, preferably linear and saturated, and each hydrocarbyl may include one or more heteroatoms, optionally selected from selected from oxygen, sulphur, nitrogen and halide; q is 1 or 2, preferably 1; Xn− is an anion of valency n.

Embodiment 11

The method of any of the embodiments 1 to 8, wherein the morphology modifier L is a monosaccharide.

Embodiment 12

The method of any of the embodiments 1 to 8, wherein the morphology modifier is an anionic surfactant.

Embodiment 13

The method of any of the embodiments 1 to 8, wherein the morphology modifier L is a nonionic surfactant.

Embodiment 14

The method of any of the above embodiments, wherein the synthesis mixture is substantially free of water-insoluble components.

Embodiment 15

The method of any of the above embodiments, wherein Y is present in the synthesis mixture and is Al, and the ratio of $XO_2:Y_2O_3$ is in the range of from 5 to 500.

Embodiment 16

The method of any of the above embodiments, wherein the molecular sieve is selected from the group consisting of ZSM-12, ZSM-22, ZSM-23, ZSM-48, SAPO-11, zeolite beta, and mixtures thereof.

Embodiment 17

The method of any of the above embodiments, wherein the molecular sieve is selected from the group consisting of ZSM-12, ZSM-22, ZSM-23, ZSM-48, SAPO-11, and mixtures thereof.

Embodiment 18

The method of any of the above embodiments, wherein the molecular sieve is ZSM-48.

Embodiment 19

The method of any of the above embodiments, wherein the molecular sieve is zeolite beta.

Embodiment 20

The method of any of the above embodiments, wherein the feedstock has a T5 boiling point of at least 400° F., a sulfur content of 100 wppm or less, or a combination thereof.

Embodiment 21

The method of any of the above embodiments, further comprising separating the dewaxed effluent to form at least one dewaxed diesel boiling range fraction, at least one dewaxed lubricating basestock fraction, or a combination thereof.

Embodiment 22

The method of any of the above embodiments, further comprising hydrofinishing the dewaxed effluent under effective hydrofinishing conditions, the hydrofinishing optionally being performed after separating the dewaxed effluent to form at least one dewaxed diesel boiling range fraction, at least one dewaxed lubricating basestock fraction, or a combination thereof.

Embodiment 23

The method of any of the above embodiments, further comprising hydrotreating the feedstock under effective hydrotreating conditions prior to said exposing, hydrocracking the feedstock under effective hydrocracking conditions prior to said exposing, hydrofinishing the feedstock under effective hydrofinishing conditions prior to said exposing, or a combination thereof.

Embodiment 24

A method for dewaxing a hydrocarbon feed using a catalyst comprising a molecular sieve, comprising:
hydrotreating the feedstock under effective hydrotreating conditions prior to said exposing, hydrocracking the feedstock under effective hydrocracking conditions prior to said exposing, hydrofinishing the feedstock under effective hydrofinishing conditions prior to said exposing, or a combination thereof;

exposing the hydrocarbon feed to a catalyst comprising crystals of a molecular sieve under effective dewaxing conditions to form a dewaxed effluent, at least a portion of the crystals of the molecular sieve being crystallized in a process comprising the steps of:

combining a source of a tetravalent element X, a morphology modifier L, water, optionally a source of hydroxide ions, optionally a structure directing agent Q, optionally a source of a trivalent element Y, optionally a source of a pentavalent element Z, optionally a source of halide ions W—, optionally a source of alkali metal ions $M^+$ and/or a source of alkali earth metal cations M2+, and optionally one or more other components to form a synthesis mixture;

heating said synthesis mixture under crystallisation conditions for a time of about 1 hour to 100 days to form the crystals of the molecular sieve; and recovering said crystals of the molecular sieve from the synthesis mixture, wherein the morphology modifier L is selected from the group consisting of sugars, cationic surfactants having a quaternary ammonium group comprising at least one alkyl having at least 12 carbon atoms, nonionic surfactants, anionic surfactants and combinations thereof, and if a structure directing agent Q is present L is different from and is present in addition to the structure directing agent Q; and hydrofinishing the dewaxed effluent under effective hydrofinishing conditions, the hydrofinishing optionally being performed after separating the dewaxed effluent to form at least one dewaxed diesel boiling range fraction, at least one dewaxed lubricating basestock fraction, or a combination thereof.

Examples

Syntheses of ZSM-48 were carried out according to the following procedures using hexamethonium dichloride (HMDC) as structure directing agent and different morphology modifiers.

Example 1. ZSM-48, Sodium Lauryl Sulfate Morphology Modifier, Morphology Modifier/$SiO_2$=0.014, 1.0 wt % of Total Mixture Dilute 1.25 g of 25% hexamethonium dichloride (HMDC) in 13.65 g of water. Stir to make sure the solution is homogeneous. Add 0.61 g of a sodium aluminate solution (7.8% Na2O, 10.0% $Al_2O_3$, 82.2% water) to the structure directing solution. Stir to homogenize the solution. Add 3.6 g of 10% NaOH solution to the HMDC/aluminate solution. Stir to homogenize the mixture. Add 0.73 g of colloidal beta seeds (17.2 wt % seeds) to the aluminate mixture. Add 1.25 g of a solution of 20 wt % sodium lauryl sulfate (anioinic surfactant morphology modifier) to the gel and stir the mixture to dissolve the morphology modifier. Add 3.91 g of Ultrasil VN3 PM modified precipitated silica (92.4% $SiO_2$) to the mixture. Stir the mixture for 15 minutes to prepare a homogeneous slurry. An approximate molar gel composition for the mixture is as follows:

$SiO_2/Al_2O_3$=100
OH—/$SiO_2$=0.174
HMDC/$SiO_2$=0.019
Modifier/$SiO_2$=0.014
$H_2O$/$SiO_2$=18.6
~5100 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Example 2. ZSM-48, Cetyltrimethylammonium Bromide Morphology Modifier, Morphology Modifier/SiO$_2$=0.011, 1.0 wt % of Total Mixture Dilute 1.25 g of 25% hexamethonium dichloride (HMDC) in 13.65 g of water. Stir to make sure the solution is homogeneous. Add 0.61 g of a sodium aluminate solution (7.8% Na2O, 10.0% Al$_2$O$_3$, 82.2% water) to the structure directing solution. Stir to homogenize the solution. Add 3.6 g of 10% NaOH solution to the HMDC/aluminate solution. Stir to homogenize the mixture. Add 0.73 g of colloidal beta seeds (17.2 wt % seeds) to the aluminate mixture. Add 1.25 g of a 20 wt % solution of cetyltrimethylammonium bromide (cationic surfactant morphology modifier) and stir the mixture to dissolve the morphology modifier. Add 3.91 g of Ultrasil VN3 PM modified precipitated silica (92.4% SiO$_2$) to the mixture. Stir the mixture for 15 minutes to prepare a homogeneous slurry. An approximate molar gel composition for the mixture is as follows:

SiO$_2$/Al$_2$O$_3$=100
OH—/SiO$_2$=0.174
HMDC/SiO$_2$=0.019
Modifier/SiO$_2$=0.011
H$_2$O/SiO$_2$=18.6
~5100 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

n-Hexadecane Hydroisomerization Model Compound Experiments

The catalyst dewaxing performance of each of the catalysts of examples 1 and 2 and a comparative reference catalyst comprising ZSM-48 which did not have a modifier present in the synthesis mixture was evaluated using n-hexadecane hydroisomerization studies according to the following procedure.

Approximately 1 cm$^3$ of catalyst in 40-60 mesh size was loaded into a 5 mm stainless steel tube reactor. Catalysts were reduced at T=250° C., for 8 hours, with a pressure of 200 psig and an H2 flowrate was 14.8 sccm followed by a cooldown to 150° C. During reaction start-up, the H$_2$ flowrate was 14.8 sccm/min, the pressure was 600 psi and the temperature was 270° C., Hexadecane, 99+%, was fed to the reactor at a rate of 0.0333 cc/min. The pressure was 600 psig and the temperature of the reactor ranged from 270 to 320° C. The conversion was varied through modifying temperatures mentioned above. Offgas products were analyzed on-line by gas chromatography with a boiling point column. Liquid products were collected and were analyzed offline, also by gas chromatograph.

Table 2 includes results indicating the performance of these catalysts at two different conversions, 30 and 80%, as compared to a reference catalyst which was ZSM-48 made with no morphology modifier. In Table 2, "Isomer Yield" is n-16 isomer yield and "2B+3B Product Fraction" is the fraction of di- and tri-branched isomeric yield in the products. The ZGM modified crystals show significant increases in multi-branched isomers, compared with the reference catalyst. They also show increased activity, as evidenced by the lower temperatures required for 30% and 80% conversion levels.

TABLE 2

Results of n-Hexadecane Hydroisomerization

| Additional Details | 2B + 3B Product fraction @ 30% conv | 2B + 3B Product fraction @ 80% conv | Isomer Yield @ 30% conv | Isomer Yield @ 80% conv | 2B + 3B Product fraction @ 30% conv | 2B + 3B Product fraction @ 80% conv | Temperature [° C.] @ 30% conv | Temperature [° C.] @ 60% conv |
|---|---|---|---|---|---|---|---|---|
| Reference | 6.1 | 14.5 | 27.3 | 75.7 | 1.8 | 12.8 | 282 | 305 |
| 1 wt. % CTAB | 15.1 | 39.5 | 28.5 | 70.8 | 3.5 | 30.2 | 268 | 285 |
| 1 wt. % SLS | 8.1 | 18.8 | 28.1 | 71.8 | 2.3 | 14.5 | 269 | 288 |

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for dewaxing a hydrocarbon feed using a catalyst comprising a molecular sieve, comprising:
   exposing the hydrocarbon feed to a catalyst comprising crystals of a molecular sieve under effective dewaxing conditions to form a dewaxed effluent, at least a portion of the crystals of the molecular sieve being crystallized in a process comprising:
   a. combining at least a source of a tetravalent element X, a morphology modifier L, and water to form a synthesis mixture;
   b. heating said synthesis mixture under crystallisation conditions for a time of about 1 hour to 100 days to form the crystals of the molecular sieve; and
   c. recovering said crystals of the molecular sieve from the synthesis mixture, wherein the morphology modifier L comprises a monosaccharide and a cationic surfactant having a quaternary ammonium group comprising at least one alkyl having at least 12 carbon atoms, and if the synthesis mixture comprises a structure directing agent Q then the morphology modifier L is different from and is present in addition to the structure directing agent Q.

2. The method of claim 1, wherein in step a) a composition comprising a source of hydroxide ions, a structure directing agent Q, a source of a trivalent element Y, a source of a pentavalent element Z, a source of halide ions W⁻, a source of alkali metal ions M⁺, or a source of alkali earth metal cations $M^{2+}$ or any combination thereof is combined into the synthesis mixture.

3. The method of claim 1, wherein the catalyst has an alpha value of at least 125.

4. The method of claim 1, wherein the catalyst has been calcined.

5. The method of claim 1, wherein the catalyst further comprises a hydrogenation metal comprising Pt, Pd, Ni, W, Co, Mo, or a combination thereof, an amount of hydrogenation metal being 0.1 wt % to 20 wt %.

6. The method of claim 1, wherein the catalyst further comprises a binder, a surface area of the binder in the bound catalyst being 150 m²/g or less.

7. The method of claim 1, wherein the effective dewaxing conditions comprise a temperature of 200 to 450° C., a hydrogen partial pressure of 1.8 MPag to 34.6 MPag (250 psig to 5000 psig), and a hydrogen treat gas rate of 35.6 m³/m³ (200 SCF/B) to 1781 m³/m³ (10,000 scf/B).

8. The method of claim 1, wherein the structure directing agent Q comprises diquat-5, diquat-6, or a combination thereof.

9. The method of claim 1, wherein a molar ratio L:X in the synthesis mixture is in the range of 0.001 to less than 0.03.

10. The method of claim 1, wherein the cationic surfactant has a single quaternary ammonium group, and wherein that single ammonium group comprises at least one C12 to C30 alkyl group bonded to the quaternary ammonium group.

11. The method of claim 1, wherein the cationic surfactant is represented by formula (1):

$$(R^1)_q(R^2)_{4-q}N^+(X^{n-})_{1/n} \qquad (1),$$

wherein:
  each $R^1$ is independently a $C_1$-$C_6$ hydrocarbyl group or a $C_1$-$C_6$ hydrocarbyl group containing one or more heteroatoms, each $C_1$-$C_6$ hydrocarbyl group or $C_1$-$C_6$ hydrocarbyl group containing one or more heteroatoms being linear or branched, saturated or unsaturated;
  each $R^2$ is independently a $C_{12}$ to $C_{30}$ hydrocarbyl or a $C_{12}$ to $C_{30}$ hydrocarbyl containing one or more heteroatoms selected from oxygen, sulphur, nitrogen and halide, each $C_{12}$ to $C_{30}$ hydrocarbyl or $C_{12}$ to $C_{30}$ hydrocarbyl containing one or more heteroatoms being branched or linear, saturated or unsaturated;
  q is 1 or 2;
  $X^{n-}$ is an anion of valency n; and
  n is 1.

12. The method of claim 1, wherein the synthesis mixture is substantially free of water-insoluble components.

13. The method of claim 1, wherein a source of trivalent element Y is present in the synthesis mixture and Y is Al, and a ratio of $XO_2$:$Y_2O_3$ is in the range of 5 to 500.

14. The method of claim 1, wherein the molecular sieve is selected from the group consisting of ZSM-12, ZSM-22, ZSM-23, ZSM-48, SAPO-11, zeolite beta, and mixtures thereof.

15. The method of claim 1, wherein the molecular sieve is selected from the group consisting of ZSM-12, ZSM-22, ZSM-23, ZSM-48, SAPO-11, and mixtures thereof.

16. The method of claim 1, wherein the molecular sieve is ZSM-48.

17. The method of claim 1, wherein the molecular sieve is zeolite beta.

18. The method of claim 1, wherein the hydrocarbon feed has a T5 boiling point of at least 400° F., a sulfur content of 100 wppm or less, or a combination thereof.

19. The method of claim 1, further comprising separating the dewaxed effluent to form at least one dewaxed diesel boiling range fraction, at least one dewaxed lubricating basestock fraction, or a combination thereof.

20. The method of claim 1, further comprising hydrofinishing the dewaxed effluent under effective hydrofinishing conditions, the hydrofinishing optionally being performed after separating the dewaxed effluent to form at least one dewaxed diesel boiling range fraction, at least one dewaxed lubricating basestock fraction, or a combination thereof.

21. The method of claim 1, further comprising hydrotreating the hydrocarbon feed under effective hydrotreating conditions prior to said exposing, hydrocracking the hydrocarbon feed under effective hydrocracking conditions prior to said exposing, hydrofinishing the hydrocarbon feed under effective hydrofinishing conditions prior to said exposing, or a combination thereof.

22. A method for dewaxing a hydrocarbon feed using a catalyst comprising a molecular sieve, comprising:

hydrotreating the hydrocarbon feed under effective hydrotreating conditions, hydrocracking the hydrocarbon feed under effective hydrocracking conditions, hydrofinishing the hydrocarbon feed under effective hydrofinishing conditions, or a combination thereof; then exposing the hydrocarbon feed to a catalyst comprising crystals of a molecular sieve under effective dewaxing conditions to form a dewaxed effluent, at least a portion of the crystals of the molecular sieve being crystallized in a process comprising the steps of:
  a. combining at least a source of a tetravalent element X, a morphology modifier L, and water to form a synthesis mixture, wherein the morphology modifier L is combined with the other components before nucleation or crystallization begins, wherein the synthesis mixture is a liquid or a mixture of a solid and liquid, and the liquid is substantially a single phase;
  b. heating said synthesis mixture under crystallisation conditions for a time of about 1 hour to 100 days to form the crystals of the molecular sieve; and
  c. recovering said crystals of the molecular sieve from the synthesis mixture, wherein the morphology modifier L comprises a monosaccharide and a cationic surfactant having a quaternary ammonium group comprising at least one alkyl having at least 12 carbon atoms, and if the synthesis mixture comprises a structure directing agent Q then the morphology modifier L is different from and is present in addition to the structure directing agent Q; and hydrofinishing the dewaxed effluent under effective hydrofinishing conditions, the hydrofinishing optionally being performed after separating the dewaxed effluent to form at least one dewaxed diesel boiling range fraction, at least one dewaxed lubricating basestock fraction, or a combination thereof.

23. The method of claim 22, wherein in step a) one or more further components selected from the group consisting of a source of hydroxide ions, a structure directing agent Q, a source of a trivalent element Y, a source of a pentavalent element Z, a source of halide ions W⁻, a source of alkali metal ions M⁺ and/or a source of alkali earth metal cations $M^{2+}$, are also combined into the synthesis mixture.

24. The method of claim 22, wherein the cationic surfactant comprises dodecyltrimethylammonium chloride, dodecyltrimethyl ammonium bromide, hexadecyltrimethylammonium chloride, hexadecyltrimethylammonium bromide, octadecyltrimethylammonium chloride, octadecyltrimethylammonium bromide, hexadecylethyldimethylammonium chloride, hexadecylethyldimethylammonium bromide, or combinations thereof.

25. A method for dewaxing a hydrocarbon feed using a catalyst comprising a molecular sieve, comprising:
   exposing the hydrocarbon feed to a catalyst comprising crystals of a molecular sieve under effective dewaxing conditions to form a dewaxed effluent, at least a portion of the crystals of the molecular sieve being crystallized in a process comprising:
   a. combining at least a source of a tetravalent element X, a morphology modifier L, and water to form a synthesis mixture, wherein the morphology modifier L is combined with the other components before nucleation or crystallization begins, wherein the synthesis mixture is a liquid or a mixture of a solid and liquid, and the liquid is substantially a single phase;
   b. heating said synthesis mixture under crystallisation conditions for a time of about 1 hour to 100 days to form the crystals of the molecular sieve; and
   c. recovering said crystals of the molecular sieve from the synthesis mixture, the molecular sieve selected from the group consisting of ZSM-12, ZSM-22, ZSM-23, SAPO-11, a zeolite of an MRE framework type, and mixtures thereof,
   wherein the morphology modifier L comprises a monosaccharide and a cationic surfactant having a quaternary ammonium group comprising at least one alkyl having at least 12 carbon atoms, and if the synthesis mixture comprises a structure directing agent Q then the morphology modifier L is different from and is present in addition to the structure directing agent Q.

26. The method of claim 25, wherein:
   the monosaccharide is glucose, fructose, galactose, or combinations thereof; and
   the molecular sieve includes the ZSM-12 molecular sieve.

* * * * *